Figure 1:
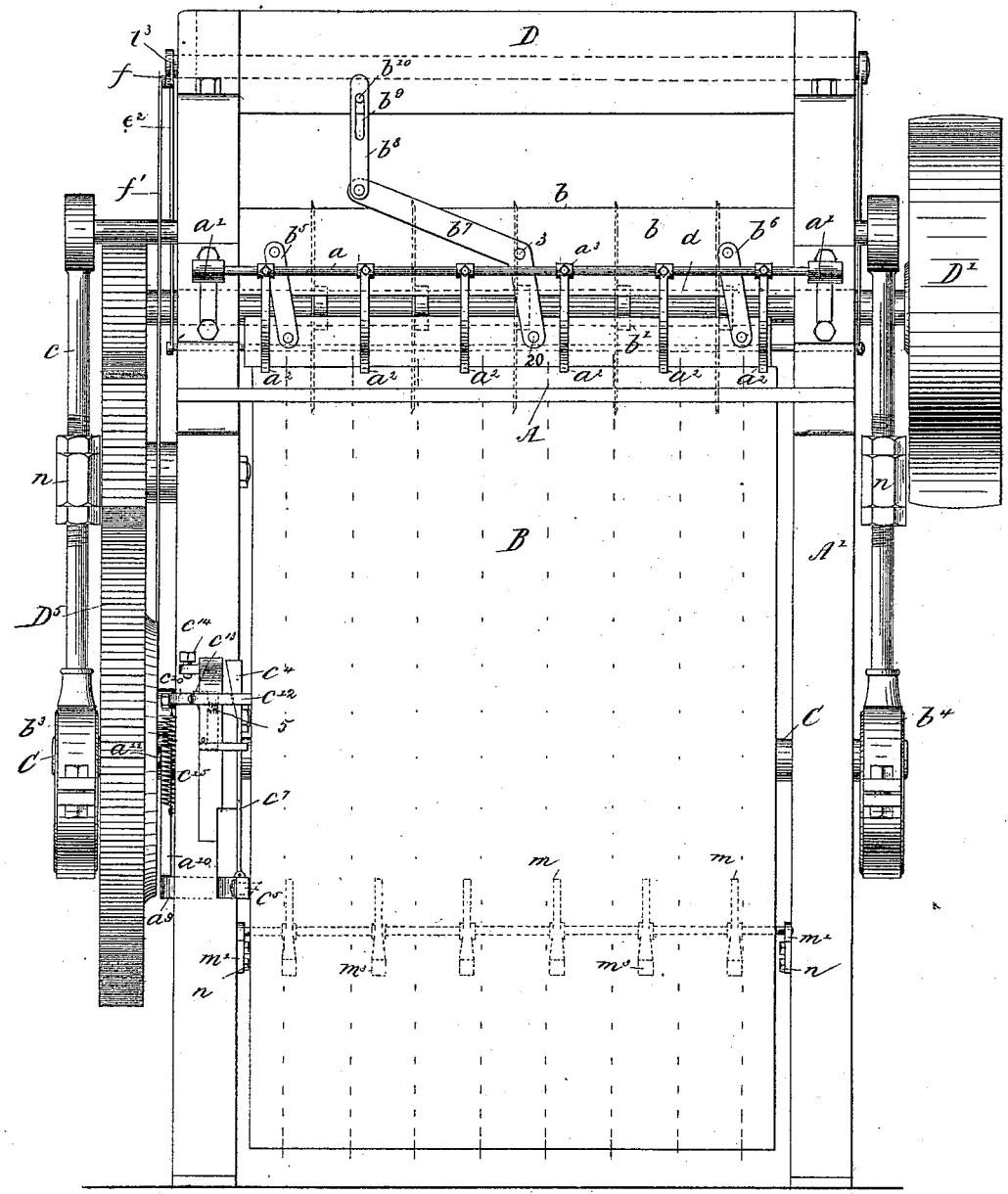

(No Model.) 4 Sheets—Sheet 1.

J. L. SHUTE & W. O. TAYLOR.
MACHINE FOR CUTTING FISH INTO BLOCKS.

No. 346,871. Patented Aug. 3, 1886.

Witnesses:
John A. Rennie
John P. C. Prindle

Inventors
James L. Shute
William O. Taylor
By Crosby & Gregory
attys.

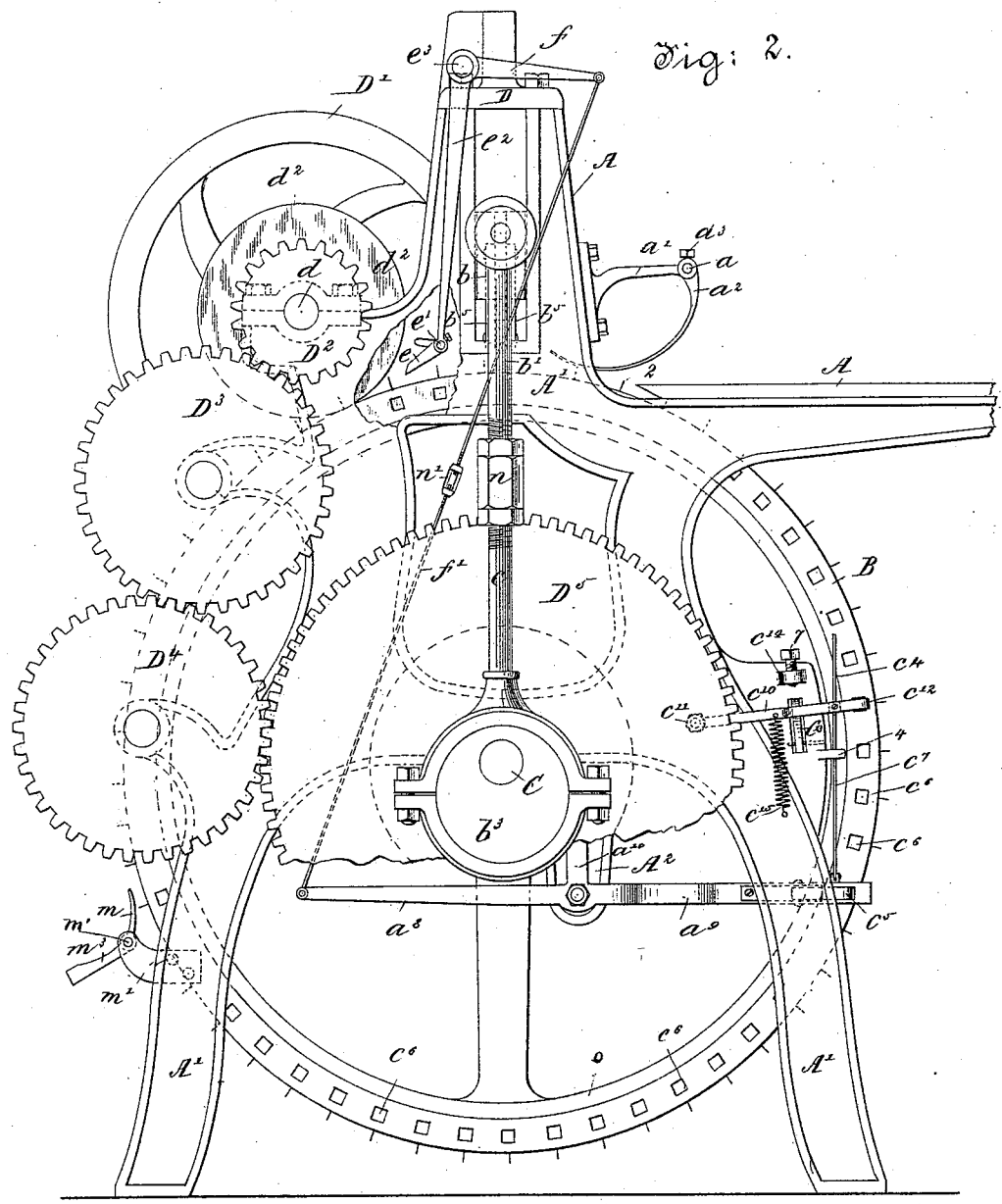

(No Model.) 4 Sheets—Sheet 3.
J. L. SHUTE & W. O. TAYLOR.
MACHINE FOR CUTTING FISH INTO BLOCKS.
No. 346,871. Patented Aug. 3, 1886.
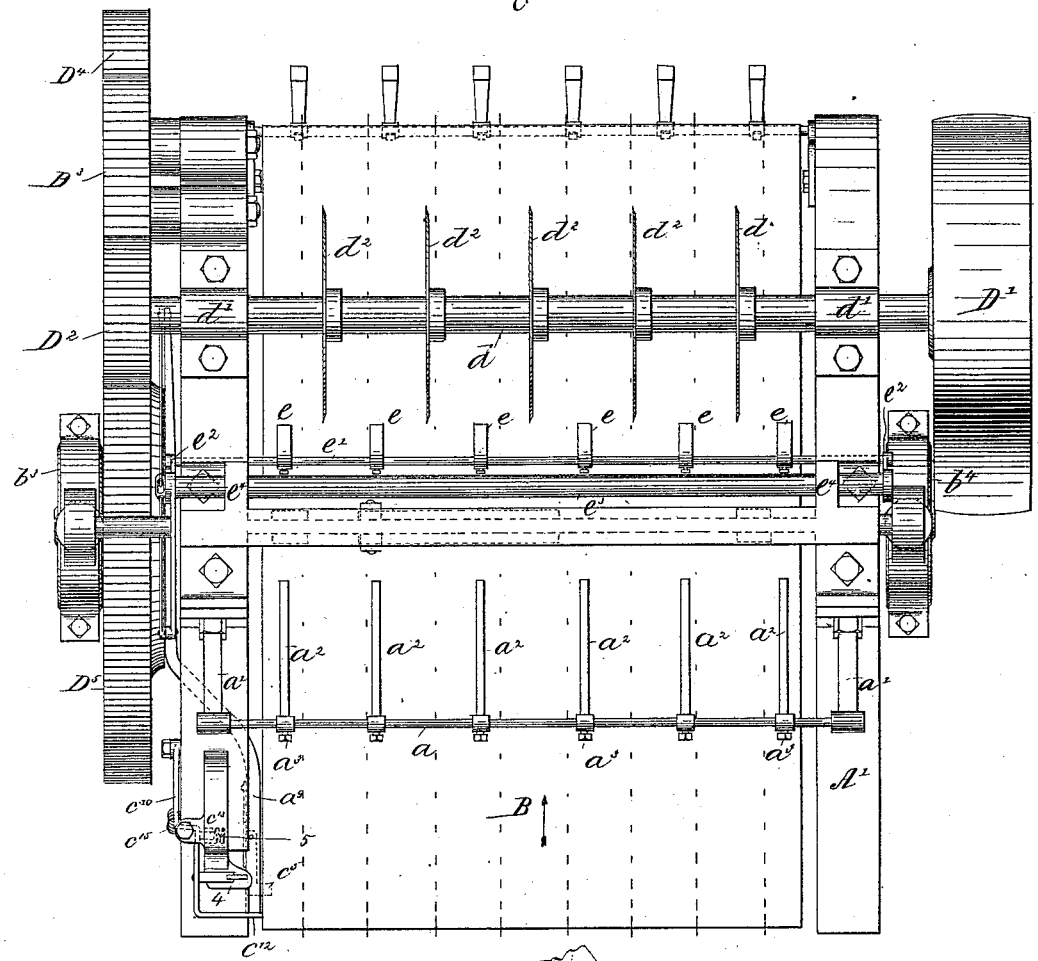
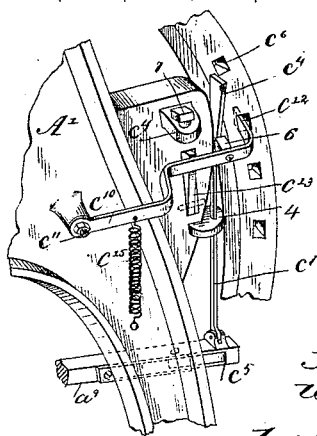
Witnesses:
John A. Renwick
John F. C. Printlerf
Inventors
James L. Shute,
William O. Taylor,
by Crosby & Gregory
Attys.
N. PETERS, Photo-Lithographer, Washington, D. C.

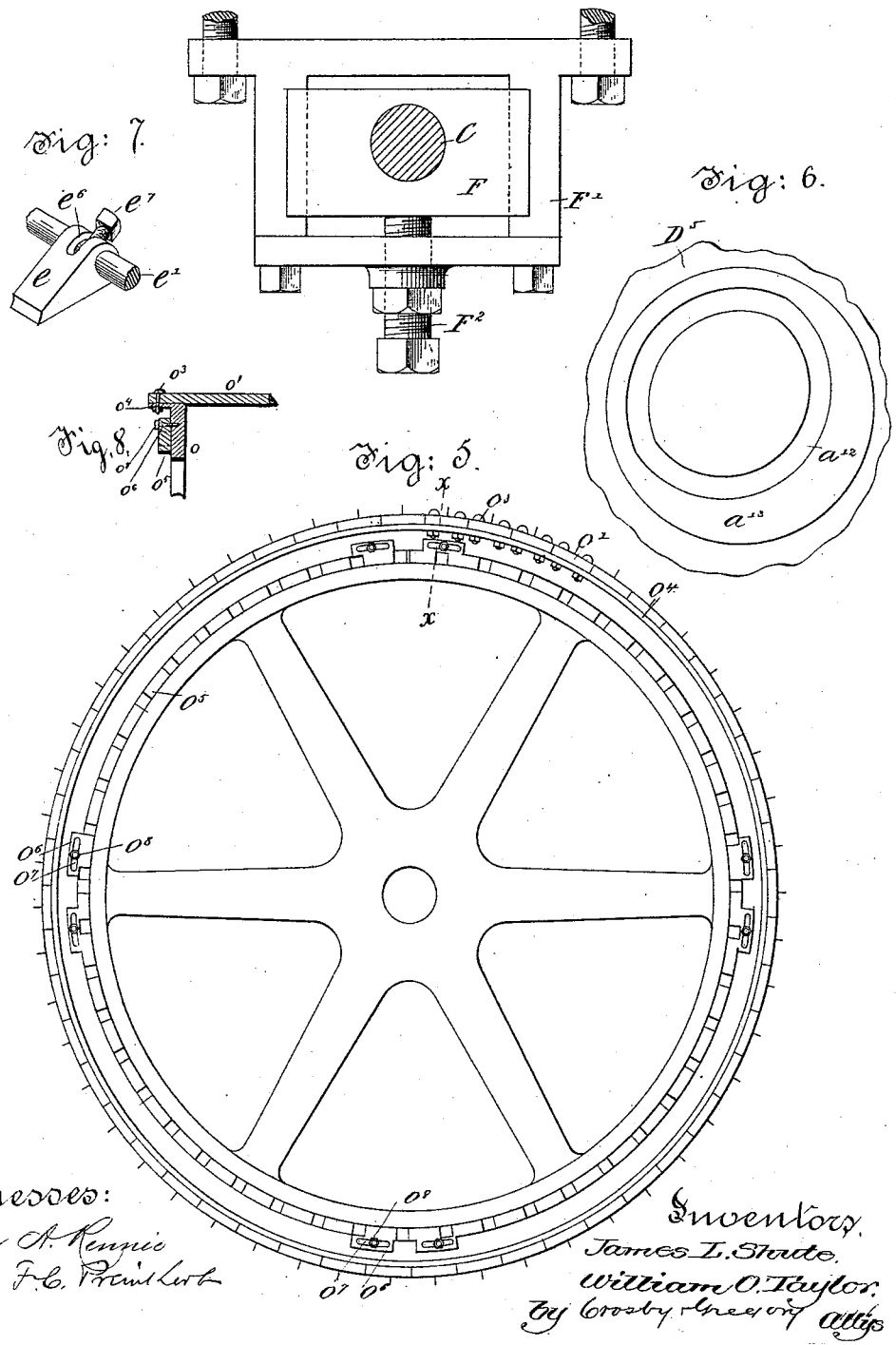

UNITED STATES PATENT OFFICE.

JAMES L. SHUTE, OF GLOUCESTER, AND WILLIAM O. TAYLOR, OF MALDEN, MASSACHUSETTS; SAID TAYLOR ASSIGNOR TO SAID SHUTE.

MACHINE FOR CUTTING FISH INTO BLOCKS.

SPECIFICATION forming part of Letters Patent No. 346,871, dated August 3, 1886.

Application filed November 30, 1885. Serial No. 184,278. (No model.)

*To all whom it may concern:*

Be it known that we, JAMES L. SHUTE, of Gloucester, county of Essex, and State of Massachusetts, and WILLIAM O. TAYLOR, of Malden, county of Middlesex, and State of Massachusetts, have invented an Improvement in Machines for Cutting Fish into Blocks, of which the following description, in connection with the accompanying drawings, is a specification, like letters on the drawings representing like parts.

This invention has for its object to construct a machine to automatically cut fish into blocks of small size after the same have been split and laid flat, the blocks being then packed in boxes for the retailer.

In accordance with this invention, the fish having been split and properly pickled, are fed upon an intermittingly rotating drum, and at regular intervals a knife descends to cut the fish transversely, the strips thus cut off being then carried forward by the said drum beneath a series of rotary or other cutters, which sever the strips into blocks, thus cutting the fish transversely and longitudinally as it is fed forward by the drum, the blocks of fish so formed being thereafter taken from the drum.

Our invention consists of a rotating drum by which the fish is fed forward, and a vertically-reciprocating cutter located above and parallel with the axis of the drum, to cut the fish transversely, combined with a series of rotary cutters mounted upon a shaft, thereby cutting the fish longitudinally or severing the strips into blocks; also, in the combination, with a rotating drum, a vertically-reciprocating cutter arranged parallel with the axis of said drum, and a series of rotary cutters mounted upon a shaft, the axis of rotation of which is parallel with the axis of rotation of the drum, of devices, substantially as will be described, for imparting to the drum an intermittent movement, a suitable stop motion therefor, and means for feeding the strips forward to be cut by the rotary cutters after they have been severed by the vertically-reciprocating cutter; also, in other details of construction, to be hereinafter more fully described, and pointed out in the claims at the end of this specification.

Figure 1 shows in front elevation a machine constructed in accordance with this invention; Fig. 1ª, a detail to be referred to; Fig. 2, a left-hand side elevation thereof; Fig. 3, a top view, the table from which the fish is fed being removed; Figs. 4, 5, 6, and 7, details to be referred to; and Fig. 8 a section of a portion of Fig. 5, taken on the dotted line $x\ x$.

The frame-work $A'$ of the machine, of proper shape to sustain the working parts, has a table, A, upon which the fish after being split is spread or laid in any usual manner, and from the said table the fish is passed upon a drum, B, mounted loosely upon a shaft, C, held in suitable bearings in the frame-work, the surface of the said drum B being provided with pins or projections 2, to enter the fish, thereby enhancing the feeding operation and retaining the fish in suitable position.

The shaft $a$, extended across the front of the machine parallel with the surface of the drum B, and held in brackets $a'$, attached to the frame-work $A'$, carries a series of bow-shaped springs, $a^2$, which bear upon the upper side of the fish as it is passed from the table A over the drum B, thereby keeping the fish pressed firmly down upon the said drum. The springs $a^2$ are adjustably connected with the shaft $a$ by suitable adjusting-screws, $a^3$.

The cross-head $b$, having its ends guided in slots in the top portion of the machine, carries a knife, $b'$, which is extended lengthwise of the machine parallel with the axis of the drum B. The cross-head $b$ is reciprocated vertically by a pair of like eccentrics, $b^3\ b^4$, secured to the main rotating shaft C, and connected with the cross-head by connecting-rods $c$. The knife $b'$ is connected with the cross-head $b$ by links $b^5\ b^6$, arranged at each end thereof.

The bent lever $b^7$, pivoted to the cross-head $b$, at 3, has one of its ends loosely connected at 20 with the knife $b'$, intermediate its length, the opposite end of the said lever being loosely connected with a link, $b^8$, provided with a slot, $b^9$, which latter co-operates with a fixed stud, $b^{10}$, projecting from the girder D. As the cross-head $b$ descends, the link $b^8$ travels downward upon the stud $b^{10}$ until its movement is checked by the limitation of the slot $b^9$, and thereafter further downward movement of the cross-head $b$ causes the bent lever $b^7$ to turn on its pivot 3 and slide or move the knife $b'$ in a direction parallel to the cross-head, thus giving to the knife what is called a "shear" or "draw" cut.

The parts described to impart to the knife the shear or draw cut may, if desired, be duplicated, to gain strength, the levers $b^7$ being located one on each side of the center of the cross-head.

The shaft $d$, parallel to the axis of the drum B, and mounted in bearings $d'\ d'$, carries a series of rotary cutters, $d^2$, the edges of which come in contact with the surface of the drum B. The main drive-wheel $D'$ is mounted upon one end of the shaft $d$, and the latter at its opposite end carries a toothed gear, $D^2$, which meshes with an intermediate, $D^3$, it in turn meshing with an intermediate, $D^4$, which latter meshes with the toothed gear $D^5$, partially broken out in Fig. 2, mounted upon the main shaft C, upon which the drum B is free to rotate.

By means of devices now to be described the drum B is caused to rotate intermittingly, to permit the knife $b'$ to descend and cut the fish without permitting the fish to crowd against the knife. Depending from the frame-work $A'$ is a bracket, $A^2$, (see Fig. 2,) to which is pivoted a rocking lever having three arms, $a^8\ a^9\ a^{10}$, one arm of which, $a^{10}$, is provided with a stud, $a^{11}$, carrying, if desired, a friction-roller, which enters a cam-groove, $a^{12}$, cut in the inner side of the hub, $a^{13}$, of the toothed gear $D^5$, said cam-groove being of the shape shown in Fig. 6, to thereby impart to the lever an intermittent rocking movement. The arm $a^9$ of the rocking lever has an inwardly-bent end, which is provided with a spring-controlled latch or dog, $c^5$, that acts as a pawl to enter one or another of the sockets $c^6$ in the end of the drum as the lever is vibrated by the cam-groove $a^{12}$ of the continuously-rotating toothed gear $D^5$, said arm and dog acting to move the drum intermittingly. The dog $c^5$ has its end beveled, in order that it may easily pass from one into another socket $c^6$. The sockets $c^6$ are entered by the bent end $c^{12}$ of a spring-lever, $c^{10}$, pivoted at $c^{11}$, upon the frame-work $A'$, the said end $c^{12}$ of the spring-lever acting as a detent and serving to hold the drum in position when not being positively moved by the dog $c^5$. The spring-lever $c^{10}$ is acted upon by a spring, $c^{15}$, which tends to move the lever down against the stop 4 whenever the lever is released from a catch, $c^{13}$, pivoted to the frame-work and normally thrown out within the range of movement of the spring-lever $c^{10}$ by a spring, 5. (See Fig. 3.) The end of the arm $a^9$ has pivoted upon it a rod, $c^7$, the upper end of which is made cam-shaped to act against a pin, 6, carried by the detaining end $c^{12}$ of the spring-lever $c^{10}$, the said cam $c^4$ in its descent acting against the said pin and throwing the detaining end $c^{12}$ out from the socket $c^6$ and beyond the upper edge of the latch $c^{13}$ when the spring $c^{15}$ acts to move the spring-lever $c^{10}$ down against a stop, 4. As the dog $c^5$ acts to move the drum, the spring-lever $c^{10}$ moves in unison with it until it strikes the screw 7, inserted in the ear $c^{14}$, attached to the frame-work, the said screw serving as a stop for the lever, and also arrests the movement of the drum. As the spring-lever $c^{10}$ strikes the screw-stop 7, the spring acting on the latch $c^{13}$ throws it out under and so as to support the spring-lever $c^{10}$ until the latter is moved from the said latch by the cam $c^4$.

To insure the forward motion of the fish with the drum B, in order that the fish may be carried properly under the rotary cutters $d^2$, we have provided feeding devices consisting of a series of fingers or dents, $e$, mounted upon a shaft, $e'$, extended across the machine parallel with the shaft $d$, upon which the rotary cutters are mounted, said shaft $e'$ being fixed in bearings in the arms $e^2\ e^2$, depending from the rock-shaft $e^3$, lying parallel with the shaft $e'$, and having its bearings in projections $e^4\ e^4$, extending from the frame-work A. The fingers $e$ are mounted loosely upon the shaft $e'$, so as to bear upon the fish regardless of its thickness, and said fingers are beveled at their ends to present sharp engaging-surfaces, so that as the shaft $e^3$ is rocked the shaft $e'$ is moved forward and the fingers $e$, engaging the fish, force the latter forward, presenting it to the rotary cutters. To prevent the fingers $e$ from coming in contact with the surface of the drum B, each finger is provided with a slot, $e^6$, (see detail, Fig. 7,) through which passes a stud, $e^7$, which normally rests at the limitation of the slot $e^6$.

As it is necessary that the fingers $e$ engage the fish to feed the same forward during the rotation of the drum B, the shaft $e^3$ is rocked at the same time that the devices imparting intermittent movement to the drum B are operated. This is done as follows, viz: An arm, $f$, (see Fig. 2,) is connected at one end of the rock-shaft $e^3$, and by a connecting-rod, $f'$, with the free end of the arm $a^8$, forming part of the rocking lever before referred to, so that as the drum is intermittingly rotated by the arm $a^9$ the shaft $e^3$ is simultaneously rocked. As herein shown, supposing the knife $b'$ to be in contact with the drum B and about to rise, and that the toothed gear $D^5$ turns one revolution as the knife rises and falls, the cam-groove $a^{12}$ in the hub of the toothed gear $D^5$ (see Fig. 6) is of such shape that the rocking lever is silent during three-sixteenths of the revolution of the toothed gear, during which time the knife $b'$ rises three-eighths of its upward stroke, freeing it from contact with the fish, while during the remaining five-eighths of its upward stroke the rocking lever is moved, the arm $a^9$ moving the drum forward, as described, and the arm $a^8$ operating the feeding devices $e$. During the first five-eighths of the downward stroke of the knife $b'$ the feeding motion is continued, (the rocking lever being moved,) while during the remaining three-eighths of the downward stroke of the knife the rocking lever is silent, or, in other words, the stud $a^{11}$, following in the cam-groove, imparts movement to the rocking lever for five-eighths of a revolution of the toothed gear $D^5$ and remains silent for three-eighths of a revolution.

We do not desire to limit ourselves to the exact periods of motion and rest stated, as it is only necessary that the drum B be at rest while the knife $b'$ is cutting the fish.

To compensate for the wear of the knives or cutters the shaft C of the drum B is held in adjustable bearings, as shown in Fig. 4, wherein the shaft C has its bearings in blocks F, moving in guideways in the hanger $F'$, attached to and depending from the frame-work $A'$. The bearing-block F is adjusted by means of the adjusting-screw $F^2$, passing upward through the hanger $F'$ from its under side; and to adjust the other parts of the machine to correspond with this adjustment the eccentric-rod $c$ is broken and supplied with adjusting-nut $n$, and the connecting-rod $f'$ is also broken and supplied with an adjusting-nut, $n'$.

To detach the blocks of fish from the drum B, we employ a series of fingers, $m$, fixed to a shaft, $m'$, lying parallel with the surface of the drum B, said shaft $m'$ being fixed to suitable brackets, $m^2$, secured to the frame-work $A'$ at opposite sides of the machine. Arms $m^3$ are also fastened to the shaft $m'$, forming continuations of the fingers $m$.

The drum B is composed of two like end portions, $o$, (see Figs. 5 and 8,) mounted loosely upon the shaft C at opposite ends, and slats or cross-pieces $o'$, extending parallel with the shaft C, are bolted by bolts $o^3$ to the flange $o^4$ of each end portion. Segments $o^5$, herein shown as four in number, are attached to the face of the end portion, $o$, each of said segments being supplied with two ears, $o^6 o^6$, having slots $o^7$, through which a headed screw, $o^8$, passes, said screw entering the face of the end portion, $o$, the slots $o^7$ permitting the segments to be moved in either direction. The segments $o^5$ are notched or socketed to permit the dog $c^5$ of the arm $a^9$ to engage therewith, to impart an intermittent motion to the drum.

When it is desired to cause the knives and cutters to come in contact with the surface of the drum B in a different place, in order to utilize the entire surface of the drum, the screws $o^8$ are loosened and the drum rotated a little, moving the segments $o^5$; and when the drum has been sufficiently rotated to present a new surface to the cutters the screws $o^8$ are tightened.

As herein shown, the fish is subjected, first, to the action of a knife, whereby it is cut transversely into strips, and then to a series of rotary cutters, whereby the strips thus cut off are severed into blocks; but it is obvious that this operation may be reversed, if desired— that is to say, it might be first presented to the rotary cutters and then to the vertically-moving knife; also, while the construction herein shown for imparting intermittent motion to the drum B, and for stopping the same, is preferable, other devices may be easily devised capable of accomplishing the same result without departing from the spirit of this invention; also that cranks may be substituted for the eccentrics $b^3$.

While it is preferable that the knife $b'$ be provided with means for swinging it in parallelism with the cross-head, yet it is obvious that the same may be rigidly connected therewith.

We claim—

1. In a machine for cutting fish into blocks, an intermittingly-rotating drum, upon which the fish is laid, combined with a vertically-reciprocating knife to cut the fish transversely, and a series of cutters to cut the fish longitudinally, substantially as described.

2. In a machine for cutting fish, an intermittingly-rotating drum, upon which the fish is laid, and a vertically-reciprocating cross-head and a longitudinally-movable knife connected therewith to cut the fish in one direction, combined with a series of cutters located at right angles to the said knife to cut the fish in an opposite direction, substantially as described.

3. In a machine for cutting fish, an intermittingly-rotating drum, upon which the fish is laid, combined with a vertically-reciprocating cross-head, a knife, $b'$, links $b^5 b^6$, and the bent lever $b^7$, for connecting said knife to the cross-head, the slotted link $b^8$ and stud $b^{10}$, whereby the knife is made to move in parallelism with the cross-head during the last part of the downward movement of the said cross-head, substantially as described.

4. In a machine for cutting fish into blocks, an intermittingly-rotating drum combined with a vertically-reciprocating knife, a series of rotary cutters, a rotating shaft upon which said cutters are mounted, the rotating toothed gear $D^5$, its shaft, and eccentrics carried by the said shaft for reciprocating the knife vertically, all substantially as described.

5. In a machine for cutting fish into blocks, an intermittingly-rotating drum, and cutters arranged at an angle with relation to each other for cutting the fish transversely and longitudinally, combined with the rotating toothed gear $D^5$, its cam-grooved hub, the arms $a^9 a^{10}$, and engaging devices, substantially as described, carried by the arm $a^9$, for engaging the said arm with the drum and disengaging the same, all substantially as described.

6. In a machine for cutting fish into blocks, the rotating drum, the fingers $e$, and cutters arranged contiguous to the surface of the drum for cutting the fish transversely and longitudinally, combined with a rotating toothed gear, $D^5$, the cam-grooved hub and rocking lever $a^8 a^9$, controlled by said cam-grooved hub for imparting an intermittent motion to the drum and also for controlling the operation of the fingers $e$, all as set forth.

7. In a machine for cutting fish into blocks, an intermittingly-rotating drum, and cutters arranged at right angles to each other for cutting the fish transversely and longitudinally, combined with the rotating toothed gear $D^5$, the cam-grooved hub, arms $a^9$ $a^{10}$, and engaging devices, substantially as described, carried by the arm $a^9$ for engaging the said arms with the drum and disengaging the same, and a stop-motion, substantially as described, for controlling the movement of the drum when the arm $a^9$ has completed its stroke, all as set forth.

8. In a machine for cutting fish into blocks, the rotating drum, and cutters arranged at right angles to each other for cutting the fish transversely and longitudinally, combined with the rotating toothed gear $D^5$, the cam-grooved hub, and arms $a^9$ $a^{10}$, controlled by said cam-grooved hub, and engaging devices carried by the arm $a^9$ for imparting an intermittent motion to the drum, the spring-controlled pivoted lever $c^{10}$, spring-controlled latch $c^{13}$, screwed in the ear $c^{14}$, and rod $c^7$, the said rod $c^7$ being controlled by the arm $a^9$, which intermittingly moves the drum, all as set forth.

9. In a machine for cutting fish into blocks, an intermittingly-rotating drum, and cutters arranged at right angles to each other for cutting the fish transversely and longitudinally, combined with the rotating toothed gear $D^5$, the cam-grooved hub, arms $a^{10}$ $a^8$, connecting-rod $f'$, arm $f$, rock-shaft moved by it, arms $e^2$, and fingers $e$, mounted upon the shaft $e'$, all as set forth.

10. In a machine for cutting fish into blocks, an intermittingly-rotating drum upon which the fish is laid, and pins 2 projecting therefrom, combined with a series of flat springs, $a^2$, and cutters arranged at right angles with relation to each other for cutting the fish transversely and longitudinally, all as set forth.

11. In a machine for cutting fish into blocks, an intermittingly-rotating drum, and cutters arranged at right angles with relation to each other for cutting the fish into blocks, combined with a series of detaching devices, substantially as described, for removing the blocks from the drum after they have been cut, all as set forth.

12. In a machine for cutting fish into blocks, an intermittingly-rotating drum, and cutters arranged at right angles to each other to cut the fish transversely and longitudinally, combined with a series of fingers or dents, $e$, constructed substantially as described, that they may move to conform to the surface of the fish, but not come in contact with the surface of the drum if no fish be present, substantially as described.

13. In a machine for cutting fish into blocks, a rotating drum and adjustable bearings therefor, combined with a vertically-reciprocating knife located parallel with the axis of the drum and a series of cutters located at right angles to the said knife, substantially as described.

14. In a machine for cutting fish into blocks, an intermittingly-rotating drum, and cutters arranged at right angles with relation to each other for cutting the fish transversely and longitudinally, combined with the rotating toothed gear $D^5$, the eccentrics $b^3$, and rods $c$, adjustable as to length, for vertically reciprocating the transverse cutter, the cam-grooved hub, and the arms $a^{10}$ $a^8$, connecting-rod $f'$, adjustable as to length, and feeding devices, substantially as described, moved by the rod $f'$, for feeding the fish forward as the drum rotates, all as set forth.

15. In a machine for cutting fish into blocks, an intermittingly-rotating drum having the end portions, $o$, slats or cross-pieces $o^3$, bolted thereto, and the adjustable notched or socketed segments $o^5$, substantially as described.

In testimony whereof we have signed our names to this specification in the presence of two subscribing witnesses.

JAMES L. SHUTE.
WILLIAM O. TAYLOR.

Witnesses:
C. M. CONE,
B. J. NOYES.